(12) United States Patent
Hotier

(10) Patent No.: US 6,797,175 B2
(45) Date of Patent: Sep. 28, 2004

(54) DEVICE FOR INJECTING A DIVERTED FLUID INTO A SIMULATED MOVING BED SEPARATION PROCESS

(75) Inventor: Gérard Hotier, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/320,714

(22) Filed: Dec. 17, 2002

(65) Prior Publication Data

US 2003/0127394 A1 Jul. 10, 2003

(30) Foreign Application Priority Data

Dec. 19, 2001 (FR) .............................................. 01 16444

(51) Int. Cl.[7] .......................... B01D 15/00; B01D 15/08
(52) U.S. Cl. .................... 210/659; 210/661; 210/198.2; 210/266; 210/283; 210/284; 210/285; 210/541
(58) Field of Search ................................ 210/661, 285, 210/266, 690, 656, 659, 198.2, 541, 284

(56) References Cited

U.S. PATENT DOCUMENTS 6,156,197 A * 12/2000 Dessapt et al. .......... 210/198.2

FOREIGN PATENT DOCUMENTS

FR 2772634 6/1999
FR 2794663 12/2000

* cited by examiner

Primary Examiner—Robert A. Hopkins
(74) Attorney, Agent, or Firm—Millen White Zelano & Branigan, P.C.

(57) ABSTRACT

A device and process for injecting a diverted fluid into a simulated moving bed comprises a vessel containing beds of adsorbant Ai separated by plates Pi for distributing and extracting fluids, each plate comprising at least one pannel, each pannel comprising a single chamber Ci for distributing, mixing and/or extracting fluid, and a bypass circuit placing a plate in communication with a bypass line (Li, j). The device also comprises means (14, Voi,j, 20) for bringing at least one chamber (Ci) into communication with at least one bypass line (Li, j); one end of the bypass line is connected with said chamber Ci of a pannel of plate Pi and the other end communicates with a region (Ri+1) of a pannel of the distributor plate Pi+1, said region being distinct from the distribution chamber Ci+1.

Application to separating n-paraffins containing 10 to 13 carbon atoms from sweetened kerosene type feeds.

10 Claims, 3 Drawing Sheets

DEVICE FOR INJECTING A DIVERTED FLUID INTO A SIMULATED MOVING BED SEPARATION PROCESS

The present invention relates to a device for injecting a stream of fluid used as a diverted fluid in a separation process employing a plurality of beds of adsorbant, a main fluid stream and a plurality of secondary fluid streams, the beds being separated by at least one fluid distributor plate, the plate possibly comprising one or more distributor-mixer-extractor panels, DME panels, which can inject and/or mix and/or extract one or more secondary fluids via a single distribution chamber.

The invention is of particular application to the device and process described in the Applicant's French patent application FR-A-2 772 634, when secondary fluids are injected and extracted by means of a single distribution network, normally termed a distribution "spider".

The invention also relates to all processes in which the purity of at least one constituent in a mixture moving through a solid adsorbant or solid catalyst is to be improved.

It can also be applied to processes for separating at least one constituent from a mixture for which any chromatographic adsorption or ion exchange separation, for example, is carried out.

Throughout the description, the term "main fluid" designates a stream of fluid that moves through the beds of adsorbant, and the term "secondary fluid" designates fluids that are used within the separation process, for example desorbant, feed, extract or raffinate and which pertain to the exterior.

The invention is of particular application to separating n-paraffins containing 10 to 13 carbon atoms from sweetened kerosene type feeds.

The prior art describes different devices and processes that can separate feeds using a simulated moving bed. The following can be cited: U.S. Pat. Nos. 2,985,589, 3,214,247, 3,268,605, 3,592,612, 4,614,204, 4,378,292, 5,200,075, 5,316,821, European patent application 0,769,316, French patent application FR-A-2 772 634 and International patent application WO-A-95 03867.

As a general rule, a simulated moving bed comprises at least three chromatographic zone, advantageously four or five, each zone being constituted by at least one bed or column section.

Between two zones there is either a point for injecting a feed to be fractionated, or a point for injecting an eluent or desorbant, or a point for drawing off an extract between the point for injecting eluent and the point for injecting feed which is located downstream (in the direction of movement of the eluent), or a point for drawing off a raffinate between each point for injecting mixture and the point for injecting eluent which is located downstream in the direction of movement of the eluent.

The assembly of beds or column sections forms a closed loop including at least one flow regulated pump for recycling the main fluid, for example between the first and last section.

During the separation process, the injection points and drawing off points of at least one section or column are generally displaced in the same direction (upstream or downstream, again in the direction of movement of the main fluid). This forms the basis of the simulated moving bed operation.

During that process, it is important for the fluid distribution in each of the beds of adsorbant to be as uniform as possible and as homogeneous as possible.

Distribution over each of the beds necessitates collecting the streams from the preceding bed (main fluid moving along the main axis of the column), the possibility of injecting an accompanying fluid or a secondary fluid while mixing the two fluids to the best possible extent, or the possibility of removing a portion of the collected fluid, or drawing it off to send it outside the device and to re-distribute a fluid over the subsequent bed.

To this end, it is possible either to convey all of the main fluid or stream in the adsorber in accordance with a scheme described in U.S. Pat. No. 2,985,589, or to remove a large portion or all of that stream outside using the process described in U.S. Pat. No. 5,200,075.

As described in patent application FR-A-2 772 634, a further solution consists, of moving the majority of the main stream internally and a minority of the stream externally, typically 2% to 20% of the stream. One advantage of such a system is that the injection and withdrawal circuits for the secondary fluids permanently have substantially the same composition. Two distributor plates are connected via an external circuit known as a synchronous bypass circuit. That circuit circulates a minority of the removed stream, ensuring an identical composition. On-off valves are connected to the bypass circuit for removing secondary fluids, along with a non-return valve. Optionally, the circuit can be provided with an on-off valve or a control valve to inject and draw off from a single plate.

Continuous rinsing of the distribution spiders of the distributor plates for the simulated moving bed separation units can be carried out in two manners:

1) when each plate is provided with at least two independent distribution networks ($D_1$ and $D_2$), network $D_1$ of plate P is brought into communication with network $D_2$ of the plate P+1, and the network $D_1$ of plate P+1 is brought into communication with network $D_2$ of plate P+2, so that on each distributor plate, all of the distribution networks have a permanent fluid circulation, and each plate experiences a flow of a stream of fluid diverted from one distribution network to the main fluid and a second fluid stream diverted in substantially the same manner from the main fluid to the second distribution network. The driving force for such flows is provided by the pressure drop caused by the flow of main fluid in the granular porous medium located between two successive distributor plates;

2) when each distributor plate is provided with a single distribution network, the bypass circuits can only be established in every other bed, for example from plate P to plate P+1, then from plate P+2 to plate P+3. If a bypass line connected plates P+1 to P+2, this would result in parallel circulation to the adsorber from the top bed to the bottom bed. The disadvantage of establishing only one bypass circuit in every other bed is that the internal flow rates would vary from one bed to the other: on beds including a bypass circuit, there would be a flow rate D, while on beds not including a bypass circuit, there would be a flow rate D+b.

A further patent FR-A-2 794 663 described a device for injecting a diverted fluid originating from a distribution, mixing and/or extraction chamber from an upstream plate in a region Ri of an adsorbant bed downstream of that plate.

The present invention concerns a device and process that are particularly suitable for separation devices in which the plates are provided with a single network for distributing secondary fluids, distributor-mixer-extractor or DME panels comprising a single distribution, extraction and/or mixing chamber.

Since users' demands for quality have increased, the purity standard to be achieved has been raised from values in the range (98.1–99%) to 99.5% for C10 to C13 n-paraffins. As a result, operators have to modify existing separation units to satisfy those new requirements.

The invention can be applied to existing units and to new units. It is used in processes and devices for separation, by adsorption in counter-current simulated moving bed processes and optionally in units comprising a rotary valve. It is applicable, for example, in a device comprising a central distribution described in U.S. Pat. No. 4,378,292, for example, in which the distributor plates are provided with a single distribution spider, when revamping a unit or during a significant change in the composition of the feed which results in a change in the configuration of the unit. The invention is also applicable to debottlenecking a unit.

More generally, the modification supplied by the scheme of the invention is particularly applicable in the case of debottlenecking operations in a unit to replace the molecular sieve and/or to mechanically strengthen the distributor plates. When this type of modification is required, it is accompanied by a change in the existing rotary valve; a change in configuration necessitates replacing the valve rotor, doubling the capacity of the rotary valve by placing a second valve in parallel. These transformations are very expensive and can advantageously be replaced by removing the rotary valve and replacing it with 96 or 120 on-off valves at about half the total cost.

Certain separations can be carried out in chromatographic columns with a sufficiently small diameter not to require a central distributor plate support. Re-injecting the diverted fluid to rinse the distribution lines into a particular zone of the adsorbant bed in accordance with FR-A-2,794,663 can have the disadvantage of thermal shock when the momentarily interrupted movement of said diverted fluid resumes. Such a thermal shock on the mineral adsorbant can result in the formation of fines, causing a substantial loss in performance.

One aim of the present invention is to define where the diverted fluid is injected into smaller diameter columns to overcome this disadvantage.

The invention concerns a device that can separate at least one compound from a mixture or a body by simulated moving bed adsorption, comprising:
- at least one vessel or column comprising one or more beds of adsorbant (Ai), two beds of adsorbant being separated by at least one plate (Pi) for distributing and extracting fluids, the plate comprising one or more panels for distributing, mixing and/or extracting fluids;
- at least one conduit for introducing a main fluid and at least one conduit for extracting main fluid;
- a plurality of conduits for extracting or injecting secondary fluids;
- a bypass circuit placing a distributor plate in communication with at least one bypass line (Li,j);
- the pannel comprising a single chamber (Ci) for distribution, mixing and/or extraction.

It is characterized in that:
- the device comprises means (14, Voi,j, 20) for bringing at least one chamber (Ci) into communication with at least one bypass line (Li,j);
- one end of the bypass line is connected with said chamber Ci of a pannel of plate Pi, and the other end communicates with a region (Ri+1) of a pannel of a distributor plate Pi+1, said region being distinct from the distribution chamber Ci+1.

The communication means comprise, for example, at least one valve Voi,j disposed on at least one bypass line (Li,j), and the end of the bypass line that is not connected to the region of the plate can be connected to an introduction and/or extraction line (Ti).

The communication means comprise, for example, at least one rotary valve, said rotary valve being connected to at least one introduction and/or extraction line (Ti) and at least to a bypass line (Li,j), said valve comprising means at least for bringing an introduction and/or extraction line into communication with at least one bypass line.

The rotary valve, an embodiment of which is described in the Applicant's patent FR-A-2 794 663, can place a plurality of groups of lines in communication, for example group $G_1$, group $G_2$ and group $G_3$, said valve comprising:
- a stator provided with a plurality of circulation means (E, F, R, S, D) for the fluid or fluids from group $G_1$, means for passage of at least two fluids $F_1$, $F_2$ from group $G_3$;
- a rotor provided with means for passage of fluids from group $G_3$ and means for placing either the fluids from group $G_1$ in communication with group $G_3$, or from group $G_3$ in communication with group $G_3$;
- the number of means for passage of fluid $F_1$ is substantially identical to the number of means for passage of fluid $F_2$, said valve comprising means for bringing at least two fluids from group $G_3$ into communication and in that the cross section for passage $S_1$ of ports for fluid $F_1$ is different from the cross section for passage $S_2$ of ports intended for fluid $F_2$.

The valve's means for passage of fluid $F_1$ and of fluid $F_2$ have, for example, respective cross sections for passage $S_1$ and $S_2$ and the ratio $S_1/S_2$ is about 4, preferably in the range 2 to 10.

The means for bringing the fluids from group $G_3$ into communication can be constituted by notches disposed in a layer of material or liner deposited on the lower surface of the rotor.

One notch, for example is of depth "pe" and the depth is at least equal to the thickness "e" of the liner.

Circulation means (E, R, S, D, F) disposed in the valve are, for example, formed from a plurality of grooves disposed on the bearing surface or upper face of the stator and the notches are disposed in the liner.

The number of these circulation means is 5, for example.

The fluid distribution circuit is, for example, disposed around said vessel, and it can comprise a main line that is divided into a plurality of secondary lines so that the fluid or fluids reach the panels forming a plate at substantially the same time.

The panels can be parallel to each other and the fluid distribution active principles comprises a main conduit, the bypass line is connected to the region of the plate, for example.

A plate is delimited, for example, by a lower screen and an upper screen and in a variation, the end of the bypass line connected with the distribution chamber of a plate Pi is connected to a distribution means disposed below said upper screen in a collecting space of a downstream plate Pi+1.

In a further variation, the end of the bypass line connected with the distribution chamber of a plate Pi can be connected to a distribution means disposed below the upper screen in a mixing chamber that is contiguous with the distribution chambers of plate Pi+1.

The invention also concerns a process for injecting a diverted fluid in a process for separating constituents of a feed by a simulated moving bed process comprising at least the following steps:

moving a main fluid through a plurality of beds of adsorbant disposed between distributor plates;

injecting and extracting secondary fluids (feed, desorbant, etc.) in a sequence that is appropriate for separating the constituents in the feed that are to be separated;

injecting a fluid diverted from one plate Pi to the subsequent plate (Pi+1).

It is characterized in that at least a portion of the main fluid is moved outside the separation vessel via a bypass line comprising at least two ends, one end being connected with a distribution chamber Ci and the other end being connected with a region of a subsequent plate Pi+1 distinct from a region (Ri+1) of said plate Pi+1, said region being distinct from Ci+1.

As an example, a fraction of the main fluid is removed from one chamber (Ci) corresponding to a plate Pi and that fraction of main fluid is injected into a mixing chamber contiguous with a distribution chamber Ci+1 of the subsequent plate Pi+1.

The diverted fluid can be injected during the whole duration of the cycle period. The flow rate of the diverted fluid is less than 5%, for example, than that traversing the bed located between Pi and Pi+1.

The device and process are applicable, for example, to separating normal paraffins containing 10 to 13 carbon atoms from sweetened kerosene type feeds.

The invention will be better understood from the following non-limiting drawings which illustrate, in a simplified manner, several embodiments of the device and associated process, in which:

FIG. 1 shows a simulated moving bed chromatographic separation column provided with a plurality of bypass lines $L_{i,j}$.

Figure 1:
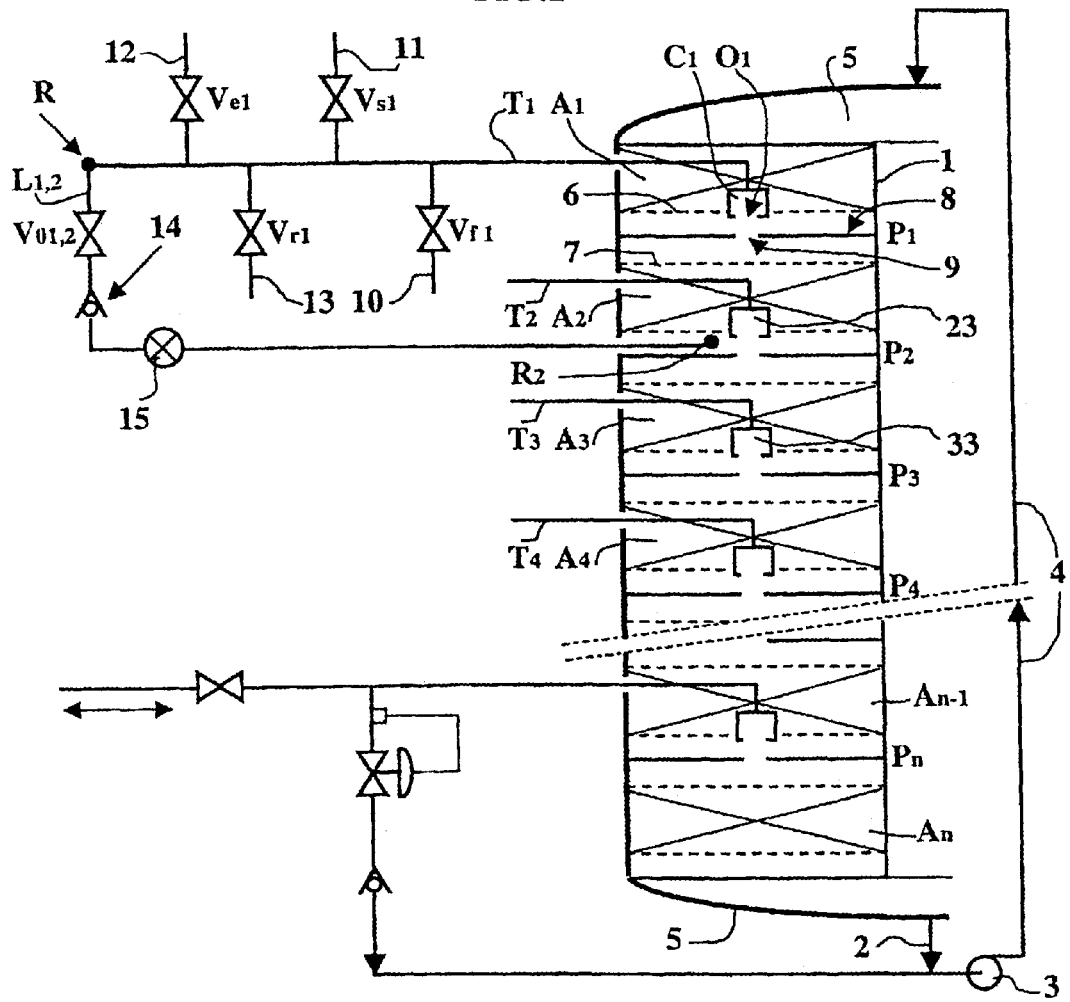
FIG. 1 shows a disposition of the bypass lines associated with a separation column.

The column comprises a vessel 1, for example substantially cylindrical, filled with an adsorbant distributed in several beds $A_1$ to $A_n$, at least one fluid distributor plate Pi being disposed between two beds of adsorbant. A plate Pi comprises one or more DMEs or panels which act to distribute, extract and/or mix one or more fluids, each pannel comprising a distribution-extraction-mixing chamber Ci which is connected to the outside via a fluid distribution spider.

Plate Pi comprises an upper screen 6 to hold the adsorbant bed, one distribution, extraction and/or mixing chamber Ci per pannel, a lower screen 7, and means such as a baffle 8 to separate the lower screen 7 from the upper screen 6. Baffle 8 is provided with a central opening 9 allowing fluid movement. Chamber Ci comprises one or more orifices Oi in its lower portion, for example. Said orifices Oi allow the passage of a secondary fluid. This latter is either introduced into the subsequent bed after having been mixed with the main fluid that has traversed the main bed, or is extracted via a suitable transfer line.

Different configurations can be envisaged for the panels or DMEs, in particular the geometries described in the Applicant's U.S. Pat. No. 5,792,346 in which the pannel comprises a single distribution, extraction and/or mixing chamber for one or more fluids.

The main fluid moves along the longitudinal axis or main axis of the column. It is extracted via a conduit 2, then recycled via a pump 3 and a conduit 4 to the column head. The column can be disposed along a substantially vertical axis or a substantially horizontal axis. The main fluid flows inside the column in a plug type flow, the composition and the flow front being substantially uniform at all points in the column cross section. A fluid distribution device (not shown in the Figure) connected with conduit 4 can optionally be provided at the column head.

A distribution, extraction and/or mixing chamber Ci is connected to the column exterior via a circuit comprising a line Ti connected to a plurality of secondary fluid transfer lines. These lines comprise, for example, a line 10 for injecting feed, a line 11 for injecting desorbant, a line 12 for drawing off an extract and a line 13 for drawing off a raffinate. Each transfer line is provided with valves Vfi, Vei, Vsi and Vri where index i corresponds to plate Pi and f designates the feed, e the extract, s the desorbent and r the raffinate. The valves are connected to sequential permutation means that can periodically advance each injection point for secondary fluid or point for drawing off secondary fluid between a bed in the direction of movement of the main fluid, i.e., from top to bottom, to obtain a counter-current simulated moving bed function. In contrast, if a simulated co-current function is desired, the valve openings are permutated upwardly in the opposite direction to that of the fluid movement.

The operating principle for said lines is given, for example, in French patent application FR-A-2 772 634 the outline of which will be given in the present application. A bypass line $L_{i,j}$ is provided with at least one of the devices mentioned below taken alone or in combination, namely a non-return valve 14, a flow meter 15, and a control valve $V_{o i,j}$, which may or may not be controlled by the flow meter. A pump that may be disposed in the bypass line can optionally supplement any insufficiency in the pressure drop.

The valve in the bypass circuit is labeled $V_{o i,j}$, in which the index o corresponds to the bypass function and the indices i,j to the plates between which the diverted fluid moves.

The terms "upstream" and "downstream" are defined with respect to the direction of flow of the main fluid in the column.

In the embodiment shown in the upper portion of FIG. 1, a first end of the line $L_{1,2}$ which bypasses the fluid between plate $P_1$ and plate $P_2$ is connected via a connection point R to line $T_1$ for introducing and/or extracting fluids which communicates with chamber $C_1$, and the second end of the line $L_{1,2}$ is connected via suitable means, some embodiments of which are detailed below, to a region labelled $R_2$ of the subsequent plate $P_2$. Such a disposition enables a fraction of the main fluid to be removed from chamber $C_1$ from bed $A_1$ of plate $P_1$, to be extracted via line $T_1$ and to be re-injected to plate $P_2$ via bypass line $L_{1,2}$ at the level of the region labelled $R_2$. The fraction that is removed flushes the bypass line and the plate distribution spider of bed $A_1$ localized immediately downstream.

A sequence in the separation process carried out in accordance with the first variation can comprise the following steps, for example:

1). Injecting feed into chamber Ci;
2). Bypassing fluid between chamber Ci of a plate Pi and the region of the subsequent plate Pi+1 between Ci and Ri+1 to simplify the description;

3). Injecting inert diluent into chamber Ci;
4). Bypassing fluid between Ci and Ri+1;
5). Drawing off extract from chamber Ci;
6). Bypassing fluid between Ci and Ri+1;
7). Injecting desorbant into chamber Ci;
8). Bypassing fluid between Ci and Ri+1;
9). Withdrawing raffinate from chamber Ci;
10). Bypassing fluid between Ci and $Ri_1$.

Clearly, the scope of the invention encompasses the cycle described above starting at a step that differs from that of injecting the feed.

Figure 2:
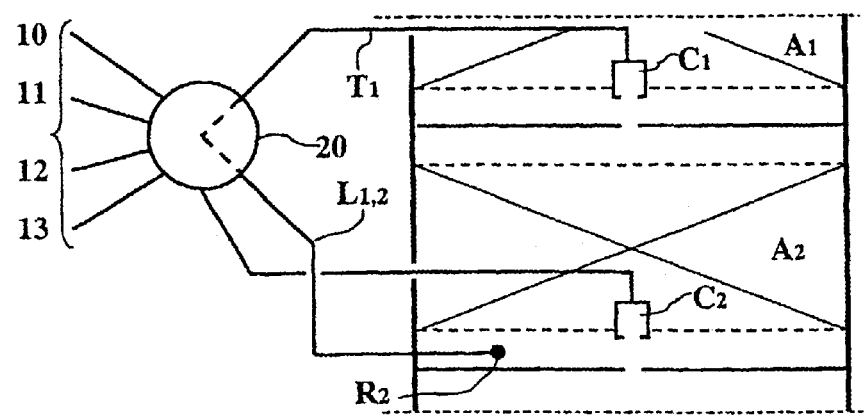
FIG. 2 shows an embodiment using "rotary" type valves.

FIG. 2 shows a further variation that differs from FIG. 1 in the circuit for introducing and extracting the secondary fluids.

In this embodiment, the circuit comprises a rotary valve 20 which acts to place the different distribution, extraction and mixing chambers Ci in communication with sources of fluid or conduits located externally of the column and to carry out the fluid bypass function.

Four transfer lines (10, 11, 12, 13) for secondary fluids that are identical to those shown in FIG. 1 are connected to the rotary valve 20.

In valve 20 there is a plurality of transfer lines Ti connected with a chamber Ci of a plate Pi and a plurality of bypass lines Li,j communicating with a region of a subsequent plate Pi+1.

Rotary valve 20 is provided with internal means that communicate:

either transfer lines 10, 11, 12, 13 for the secondary fluids with transfer lines Ti;

or a zone Ri+1 of a plate Pi+1 with an injection, extraction, mixing chamber Ci of a plate Pi to carry out the fluid bypass function;

or, optionally, transfer lines 10, 11, 12, 13 with bypass lines Li,j and transfer lines Ti to carry out the fluid diverting or bypass function, and simultaneously injection or extraction.

As an example, in FIG. 2, to carry out the fluid bypass or diverting function, the fluid removed from chamber $C_1$ from plate P1 moves in line $T_1$ then, using the appropriate means in the valve described below it, is sent to bypass line $L_{1,2}$ at the level of region $R_2$ disposed in plate P2 pertaining to adsorbant bed $A_2$.

The principle of operation of the separation process is identical to that given in the example for FIG. 1.

Figure 3A:
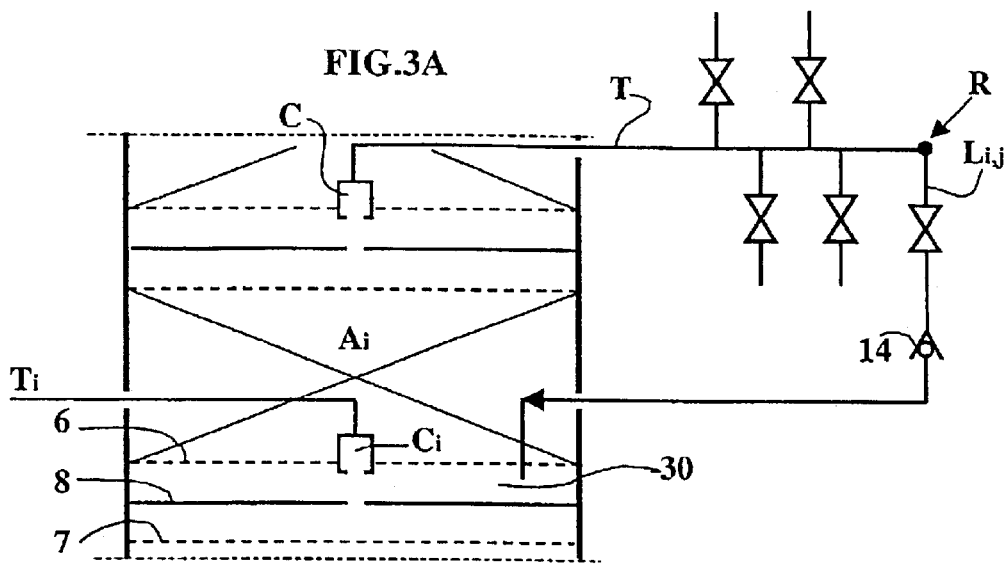
FIGS. 3A, 3B, 3C show examples of devices for injecting diverted fluid disposed in the distributor plate, for example in a collection zone (FIG. 3B) or in a mixing zone (FIG. 3C)
Figure 3B:
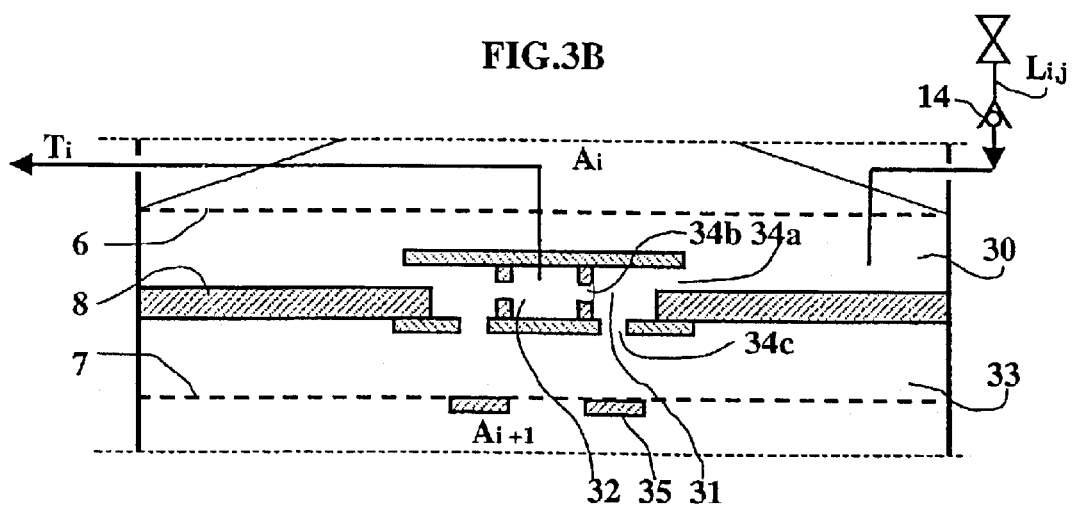
Figure 3C:
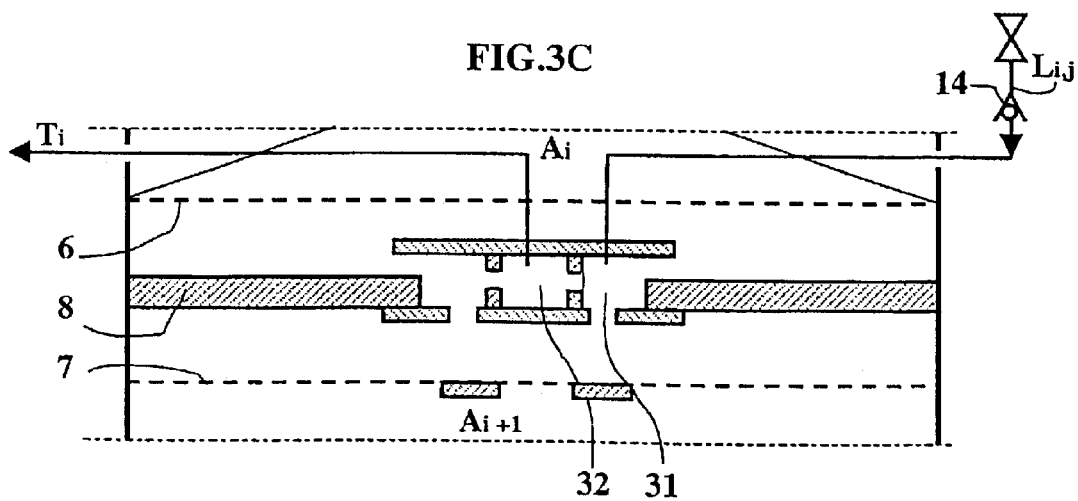

Regarding the end of the bypass line Li,j to re-inject a fraction of the main fluid that is connected to a zone of the distributor plate, the re-injection means can be formed by a line simply disposed below the upper screen 6 of a plate, into a collection zone 30 for the main fluid (FIGS. 3A, 3B) above baffle 8 or into a zone 31 for mixing the main fluid and the secondary fluids (FIG. 3C) that is contiguous with the distribution chamber 32 to allow the passage of the fraction of the main fluid removed from chamber Ci of plate Pi, into region 30, 31 of plate Pi+1 (FIGS. 3A, 3B, 3C). The mixing chamber 31 in FIG. 3B comprises at least three orifices: the diverted fluid injected into the volume between the upper screen 6 and the baffle 8 penetrates into the mixing chamber via orifice 34a. A minor portion of the fluid flows in the distribution chamber 32 via orifice 34b and the major portion of the fluid flows towards the lower screen via lower orifice 34c. An anti-splash 35 beneath orifice 34c disperses the recovered fluid. In a variation, the re-injection region 33 can also be below the baffle 8 and above the lower screen 7.

Figure 4:
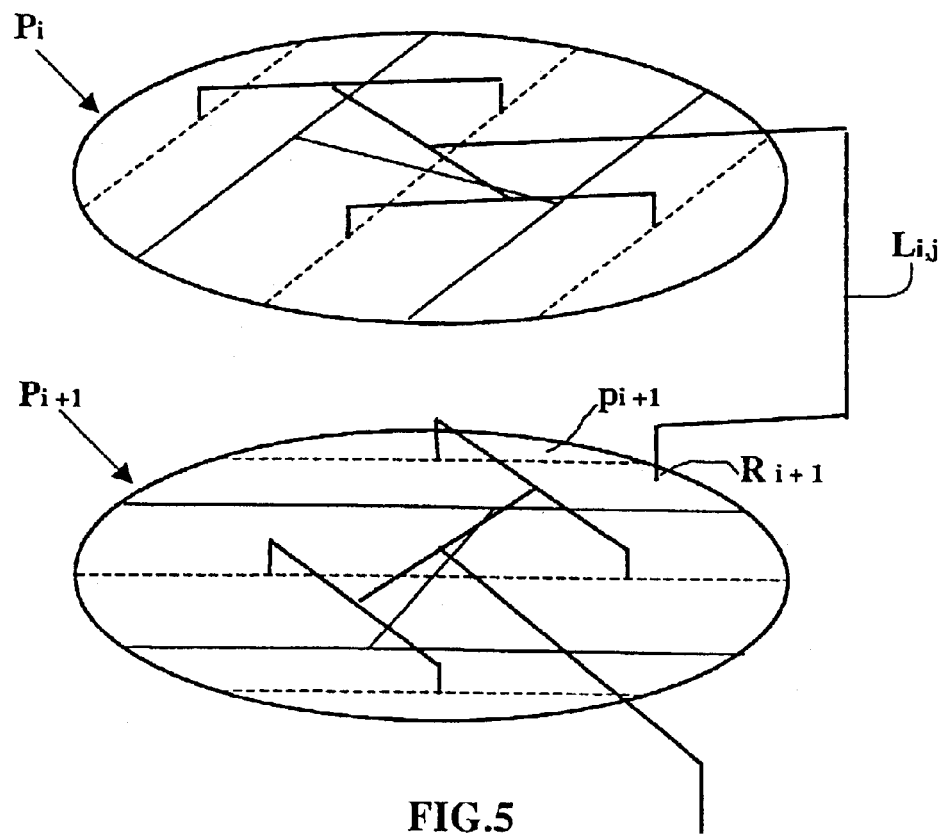
FIG. 4 shows an example of connecting two successive plates with the panels orientated perpendicularly from one stage to the subsequent.

FIG. 4 shows an example of the connection of two successive plates showing the re-injection point for line Li,j into a region Ri+1 of the collection space of one of 4 panels Pi+1 of the distributor plate. In this non limiting example, the orientation of panels Pi and Pi+1 is perpendicular from one stage to the subsequent, while the re-injection lines can form an angle of 120° from one stage to the subsequent.

Figure 5:
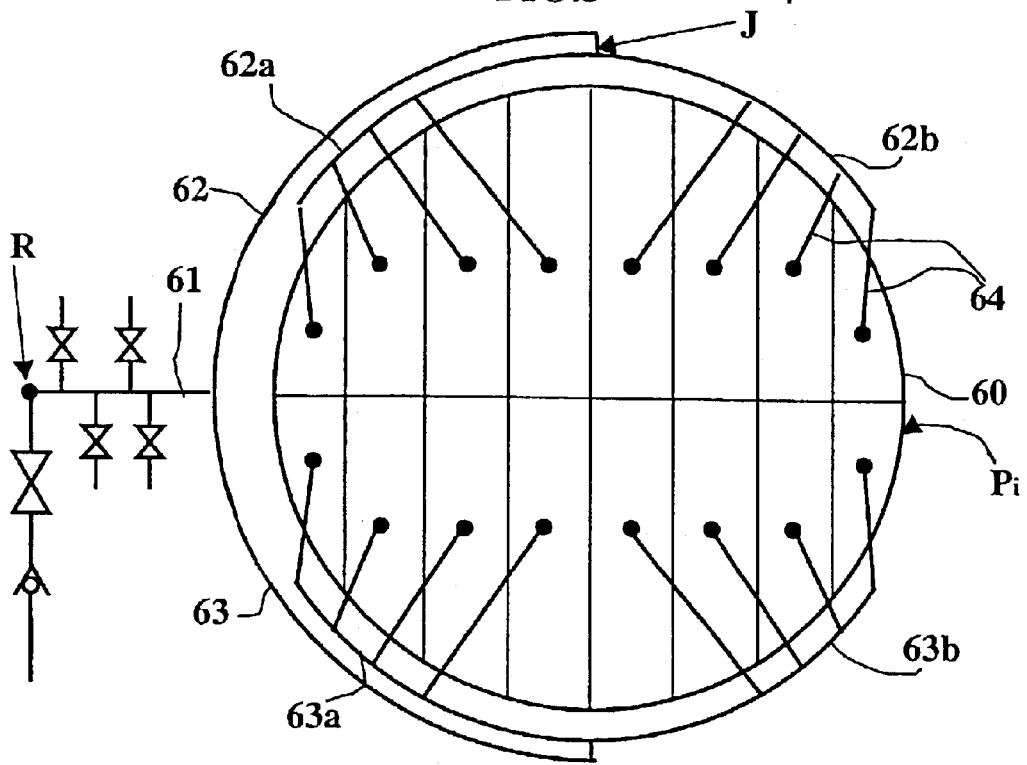
FIG. 5 shows a top view of a distribution system disposed around a separation column.

FIG. 5 shows a top view of a distribution system disposed at the periphery of a separation column 60. The column comprises a plurality of plates Pi distributed in a manner that is substantially similar to that described in the preceding figures. Each plate Pi is formed from a plurality of panels each including a single distribution-extraction-mixing chamber Ci. A plate Pi can be divided into a plurality of sectors, for example four sectors in this embodiment. Each chamber Ci is connected to the fluid distribution and extraction system via transfer lines 61 arranged, for example, in the manner given below.

The distribution system comprises a transfer line 61 which is subdivided into two conduits 62, 63. Conduits 62 and 63 are themselves subdivided into conduits 62a, 62b and 63a, 63b to distribute and/or extract fluids to or from the four sectors of the plate.

The end of a sub-conduit 62a, 62b, 63a, 63b distinct from junction point J comprises, in a given zone, one or more conduits 64 the number of which is equal to the number of panels forming a sector. The fluids then reach the panels forming a plate at substantially the same time.

The preceding examples can be repeated with similar success by substituting the generically or specifically described reactants and/or operating conditions of this invention for those used in the preceding examples.

The entire disclosure[s] of all applications, patents and publications, cited herein and of corresponding French application No. 01/16.444, filed Dec. 19, 2001 is incorporated by reference herein.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A device for separating at least one compound from a mixture or a body by simulated moving bed adsorption, comprising:

at least one vessel or column comprising one or more beds of adsorbent (Ai), two beds of adsorbent being separated by at least one plate (Pi) for distributing and extracting fluids, the plate comprising one or more panels for distributing, mixing and/or extracting fluids;

at least one conduit (4) for introducing a main fluid and a conduit (2) for extracting main fluid;

a plurality of conduits (10, 11, 12, 13, Ti) for extracting or injecting secondary fluids;

a bypass circuit placing a distributor plate in communication with at least one bypass line (Li,j);

the panel comprising a single chamber (Ci) for distribution, mixing and/or extraction wherein:

the device comprises means (14, Voi,j, 20) for bringing at least one chamber (Ci) into communication with at least one bypass line (Li,j);

one end of the bypass line is connected with said chamber Ci of a panel of plate Pi, and the other end communicates with a region (Ri+1) of a panel of a distributor plate Pi+1, said region being distinct from the distribution chamber Ci+1.

2. A device according to claim 1, wherein said communication means comprise at least one valve Voi,j disposed on at least one bypass line (Li,j), and in that the end of the bypass line that is not connected to the region of the plate is connected to an introduction and/or extraction line (Ti).

3. A device according to claim 1, wherein said communication means comprise at least one rotary valve (20), said rotary valve being connected to at least one introduction and/or extraction line (Ti) and at least one bypass line (Li,j), said valve comprising means at least for communicating an introduction and/or extraction line with at least one bypass line.

4. A device according to claim 1, wherein the fluid distribution circuit is disposed around said vessel, and in that it comprises a main line (61) that is divided into a plurality of secondary lines (62, 63, 62a, 62b) so that the fluid or fluids reach the panels forming a plate at substantially the same time.

5. A device according to claim 1, wherein the panels are parallel to each other, in that the fluid distribution device comprises a main line connected to secondary lines pertaining to each panel of the plate, and in that the bypass line is connected to a region of a panel.

6. A device according to claim 1, wherein a plate is delimited by a lower screen (7) and an upper screen (6) and in that the end of the bypass line connected with the distribution chamber of a plate Pi is connected to a distribution means disposed below said upper screen in a collection space (30) of a downstream plate (Pi+1).

7. A device according to claim 1, wherein a plate is delimited by a lower screen (7) and an upper screen (6) and in that the end of the bypass line connected with the distribution chamber of a plate Pi is connected to a distribution means disposed below said upper screen in a mixing chamber (31) contiguous with the distribution chamber (32) of plate Pi+1.

8. A process for injecting a diverted fluid into a process for separating constituents of a feed by a simulated moving bed process, comprising:
  moving a main fluid through a plurality of beds of adsorbent contained between plates;
  injecting and extracting secondary fluids (feed, desorbent, etc.) in a sequence that is appropriate to separate the constituents in the feed;
  injecting a fluid diverted from one plate to the subsequent plate;
wherein at least a portion of the main fluid is moved outside the separation vessel via a bypass line, one of the ends of the line being connected with a distribution chamber Ci of the plate Pi and the other end being connected with a region of the subsequent plate Pi+1 distinct from a chamber Ci+1 of said plate Pi+1.

9. A process according to claim 8, wherein a fraction of the main fluid is removed from one chamber (Ci) and said fraction is injected into a mixing chamber (31) contiguous with a distribution chamber Ci+1 (32) of the subsequent plate Pi+1.

10. A process of claim 8 comprising separating C10 to C13 normal paraffins from sweetened kerosene feeds.

* * * * *